(12) United States Patent
Grover

(10) Patent No.: US 12,047,617 B2
(45) Date of Patent: *Jul. 23, 2024

(54) AUTOMATICALLY DETERMINING AN OPTIMAL SUPPLEMENTAL CONTENT SPOT IN A MEDIA STREAM

(71) Applicant: Roku, Inc., San Jose, CA (US)

(72) Inventor: Matthew Grover, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,881

(22) Filed: Aug. 3, 2023

(65) Prior Publication Data

US 2023/0379511 A1 Nov. 23, 2023

Related U.S. Application Data

(63) Continuation of application No. 17/696,611, filed on Mar. 16, 2022, now Pat. No. 11,770,566.

(51) Int. Cl.
*H04N 21/234* (2011.01)
*H04N 21/25* (2011.01)
*H04N 21/258* (2011.01)
*H04N 21/262* (2011.01)
*H04N 21/431* (2011.01)
*H04N 21/44* (2011.01)
(Continued)

(52) U.S. Cl.
CPC ..... *H04N 21/23418* (2013.01); *H04N 21/262* (2013.01); *H04N 21/812* (2013.01)

(58) Field of Classification Search
None
See application file for complete search history.

(56) References Cited

U.S. PATENT DOCUMENTS

| | | |
|---|---|---|
| 9,881,318 B1 * | 1/2018 | Krishnamoorthy ............... G06Q 30/0246 |
| 11,223,864 B1 | 1/2022 | Malik et al. |
| 11,336,930 B1 * | 5/2022 | Gupta ................. G06V 20/635 |

(Continued)

OTHER PUBLICATIONS

International Search Report and Written Opinion, for PCT Appl. No. PCT/US2023/064411, 9 pages, dated Jul. 4, 2023.

*Primary Examiner* — Brian T Pendleton
*Assistant Examiner* — Jean D Saint Cyr
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for determining an optimal spot to insert supplemental content into a media stream to maximize the consumption of the supplemental content by users. An example embodiment operates by performing automated content recognition (ACR) on the media stream, thereby determining scene changes in the media stream. The embodiment identifies a plurality of potential supplemental content spots in the media stream based on the determined scene changes. The embodiment then performs a multivariate test involving test supplemental content over a portion of the potential supplemental content spots to a plurality of media devices, thereby determining the optimal supplemental content spot among the plurality of potential supplemental content spots in the media stream.

20 Claims, 4 Drawing Sheets

(51) Int. Cl.
*H04N 21/45* (2011.01)
*H04N 21/81* (2011.01)

(56) References Cited

U.S. PATENT DOCUMENTS

| | | |
|---|---|---|
| 2016/0227277 A1* | 8/2016 | Schlesinger ..... H04N 21/44218 |
| 2017/0238037 A1* | 8/2017 | Grover ............... H04N 21/2407 |
| | | 725/19 |
| 2019/0104331 A1 | 4/2019 | Bapna et al. |
| 2021/0019781 A1* | 1/2021 | Karanth ............. G06Q 30/0246 |
| 2021/0084386 A1 | 3/2021 | Chen |
| 2021/0281901 A1 | 9/2021 | Grover |

* cited by examiner

AUTOMATICALLY DETERMINING AN OPTIMAL SUPPLEMENTAL CONTENT SPOT IN A MEDIA STREAM

CROSS-REFERENCE TO RELATED APPLICATIONS

This application is a continuation of U.S. patent application Ser. No. 17/696,611, filed Mar. 16, 2022, which is herein incorporated by reference in its entirety.

BACKGROUND

Field

This disclosure is generally directed to automatically determining an optimal supplemental content spot in a media stream, and more particularly to automatically determining an optimal supplemental content spot in a media stream using automated content recognition (ACR) and multivariate testing.

Background

A content provider often wants to ensure that users who are consuming their content keep consuming their content through an advertisement or other supplemental content break. At different points during a media stream, a user may be more or less motivated to keep consuming content after an advertisement break. For example, at different points during an episode of a television (TV) show, the user may be more or less motivated to keep watching the episode after an advertisement break. The user may be more likely to keep watching the episode through an advertisement break if a cliffhanger scene has been setup but not resolved yet. By contrast, the user may be less likely to keep watching the episode through an advertisement break if the cliffhanger scene has been resolved. Thus, there is a need to automatically determine an optimal spot to insert supplemental content into a media stream to maximize the consumption of the supplemental content by users.

SUMMARY

Provided herein are system, apparatus, article of manufacture, method and/or computer program product embodiments, and/or combinations and sub-combinations thereof, for automatically determining an optimal spot to insert supplemental content into a media stream to maximize the consumption of the supplemental content by users. Existing approaches for inserting supplemental content (e.g., an advertisement, informational message, etc.) into a media stream fail to consider that at different points of time during the media stream a user is more or less likely to keep watching through the supplemental content. For example, the user may be more likely to keep watching a TV episode through an advertisement break if a cliffhanger scene has been setup but not resolved yet. By contrast, the user may be less likely to keep watching the episode through an advertisement break if the cliffhanger scene has been resolved.

Moreover, existing approaches often fail to consider the unique characteristics of the users consuming the media stream. For example, existing approaches often fail to consider that the appropriate point in time to insert supplemental content into a media stream varies depending on the unique characteristics of the users consuming the media stream. For example, a user may be more likely to keep watching a TV episode through an advertisement break at one time of the day (e.g., at 7 PM) than at another time of day (e.g., at 1:00 AM).

Finally, existing approaches often involve manually inserting supplemental content into a media stream at an appropriate point in time (e.g., right after a cliffhanger scene that has been setup but not resolved yet). But manually inserting the supplemental content into the media stream is often time intensive and error prone.

In contrast to existing approaches, embodiments described herein solve these technological problems by performing a multivariate test (e.g., an A/B test) over a plurality of media devices using different potential supplemental content spots. An example embodiment operates by performing ACR on a media stream, thereby determining scene changes in the media stream. The embodiment then identifies a plurality of potential supplemental content spots in the media stream based on the determined scene changes. The embodiment then performs a multivariate test involving test supplemental content over a portion of the potential supplemental content spots to a plurality of media devices, thereby determining the optimal supplemental content spot among the plurality of potential supplemental content spots in the media stream. The embodiment then transmits the media stream with the supplemental content in the optimal supplemental content spot to a media device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically determining an optimal spot to insert supplemental content into a media stream to maximize the consumption of the supplemental content by a user of a media device.

Figure 1:
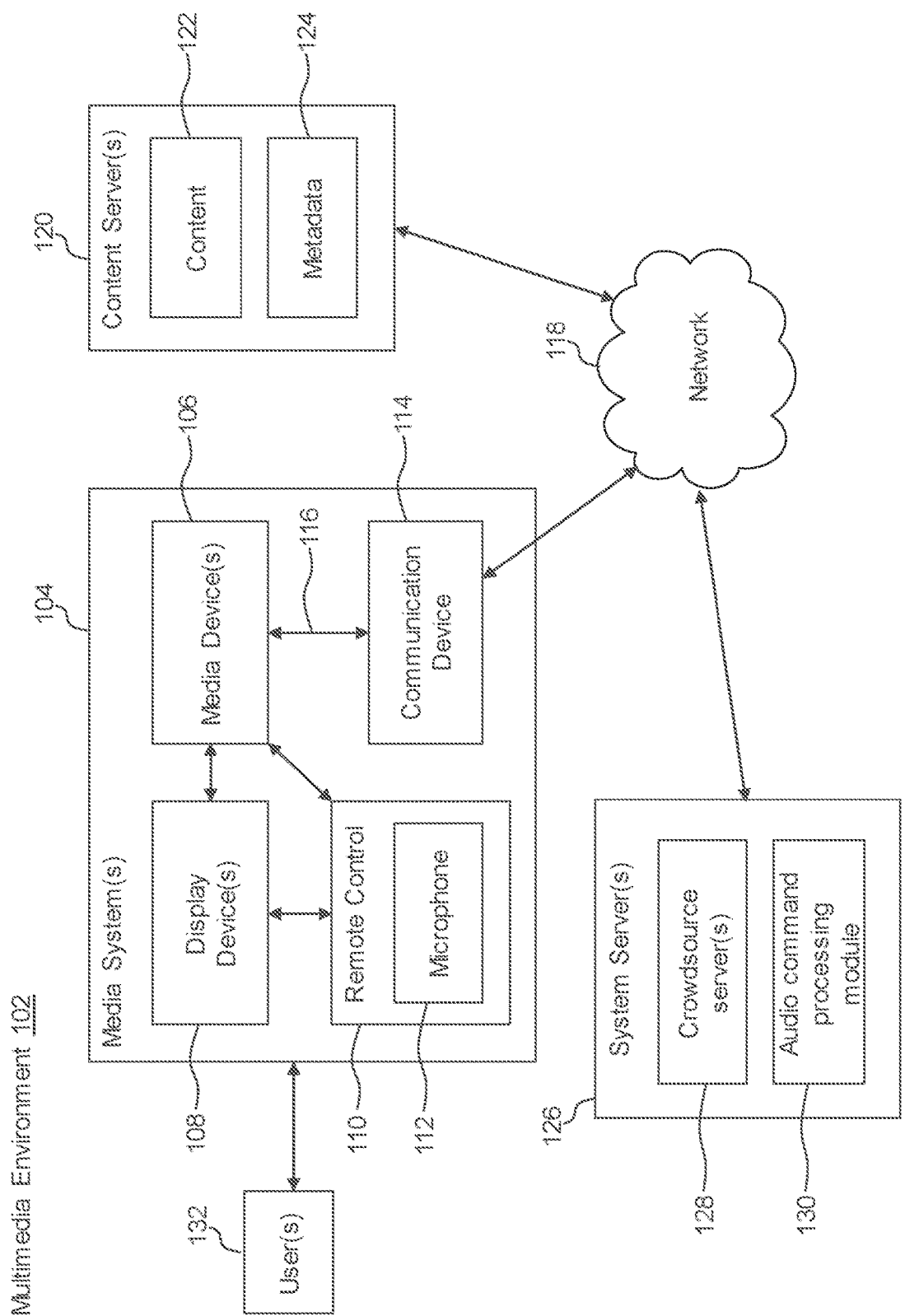
FIG. 1 illustrates a block diagram of a multimedia environment, according to some embodiments.

Various embodiments of this disclosure may be implemented using and/or may be part of a multimedia environment 102 shown in FIG. 1, in some embodiments. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content sources 120 (also called content providers, channels or sources 120). Although only one content server 120 is shown in FIG. 1, in practice the multimedia environment 102 may include any number of content sources 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126. It is also noted that the structural and functional aspects of the system servers 126 may wholly or partially exist in the same or different ones of the content sources 120.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
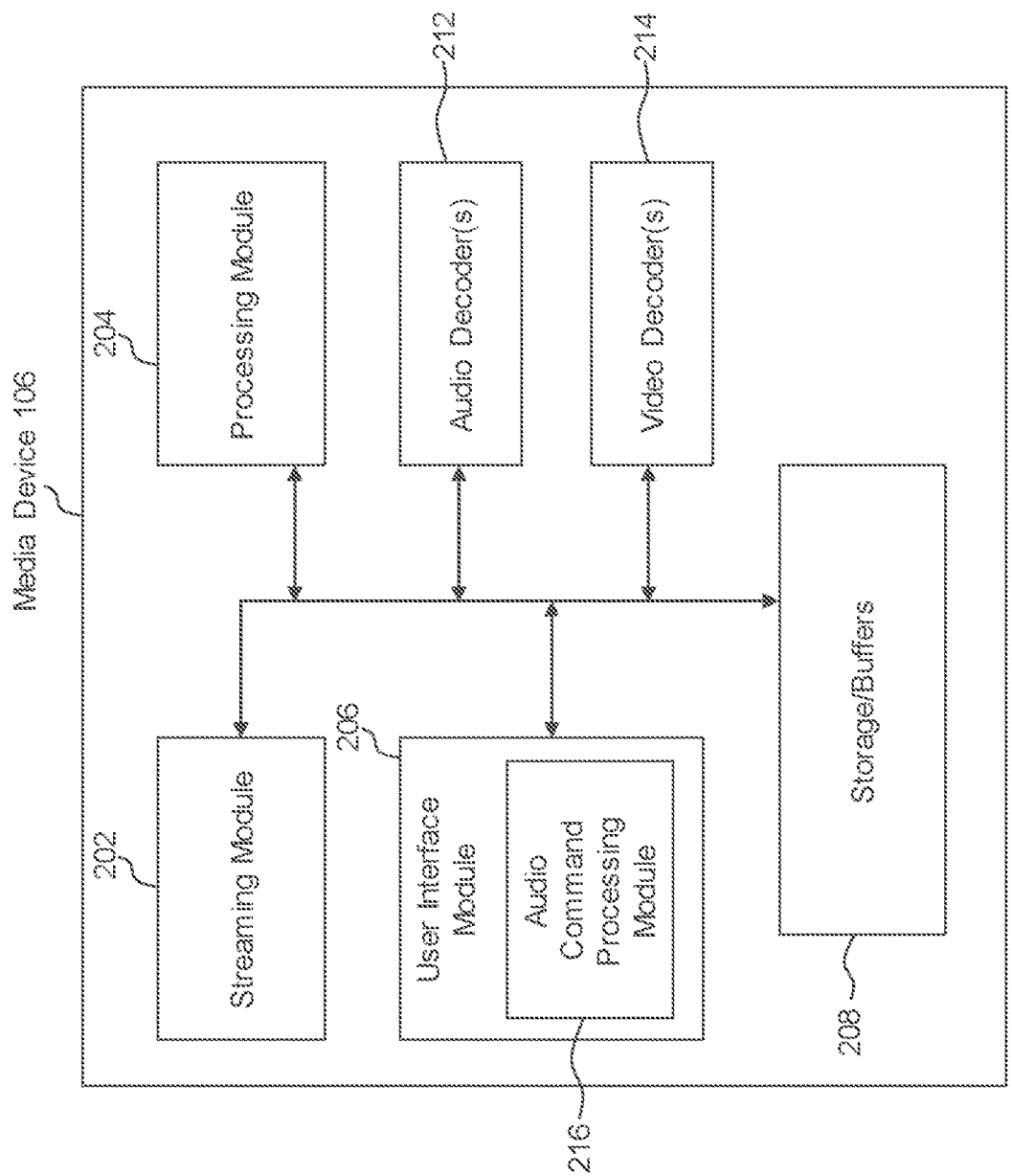
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Automatic Determination of an Optimal Spot to Insert Supplemental Content into a Media Stream Referring to FIG. 1, a content source 120 may transmit a media stream to a media device 106 via network 118. The content source 120 may insert supplemental content (e.g., an advertisement, an informational message, etc.) into the media stream. To maximize the consumption of the supplemental content by a user of the media device 106, the content source 120 may want to determine the optimal spot (e.g., an optimal time point, spatial location, etc.) to insert the supplemental content into the media stream. In some embodiments, the content source 120 determines the optimal spot to insert the supplemental content into the media stream using multivariate testing.

For example, the content source 120 may perform ACR on the media stream, thereby determining scene changes in the media stream. The content source 120 may then identify one or more potential supplemental content spots in the media stream based on the determined scene changes. The content source 120 may then perform a multivariate test (e.g., an A/B test) involving a plurality of media devices 106. For example, the content source 120 may transmit the media stream with test supplemental content in different ones of the potential supplemental content spots to the plurality of media devices 106. Based on the results of the multivariate test, the content source 120 may determine the optimal supplemental content spot among the plurality of potential supplemental content spots in the media stream. The content source 120 may then transmit the media stream with the supplemental content in the optimal supplemental content spot to the media device 106.

It is noted that the structural and functional aspects of the content source 120 may wholly or partially exist in the same or different ones of other content sources or servers. For example, the structural and functional aspects of the content source 120 may wholly or partially exist in a system server 126.

As discussed above, the content source 120 may transmit a media stream to a media device 160 via network 118. The media stream may be any type of media including, but not limited to, video or audio. The content source 120 may insert supplemental content into the media stream. The supplemental content may be any type of content including, but not limited to, advertisements, informational messages, social media posts, blog posts, call to action buttons, and navigation menus.

To maximize the consumption of the supplemental content by a user of the media device 106, the content source 120 may want to determine the optimal spot to insert the supplemental content into the media stream. The optimal spot may be a particular time point in the media stream. The optimal spot may also be a particular spatial location in the media stream. For example, the optimal spot may be the upper right corner in a video media stream that does not block the main content of the video media stream.

To maximize the consumption of the supplemental content by a user of the media device 106, the content source 120 may want to insert the supplemental content into the media stream based on a scene change. For example, in the case of a video media stream, the content source 120 may want to insert the supplemental content into the media stream after a cliffhanger scene has been setup but not resolved yet. In the case of an audio media stream, the content source 120 may want to insert the supplemental content into the media stream just before the main chorus of a song.

The content source 120 may want to insert the supplemental content into the media stream based on a scene change because a user may be more likely to keep watching or listening through the supplemental content depending on the type of scene change. For example, the user may be more likely to keep watching a TV episode through an advertisement break if a cliffhanger scene has been setup but not resolved yet. By contrast, the user may be less likely to keep watching the episode through an advertisement break if the cliffhanger scene has been resolved.

The content source 120 may perform ACR to identify scene changes in the media stream. ACR is a technology for identifying content to be played on a media device (e.g., media device 106) or present within a media file. ACR may involve generating a unique fingerprint from the content itself. The generated fingerprint may then be used to lookup the same or equivalent content having the same fingerprint. Fingerprinting may be agnostic to content format, codec, bit rate, and or compression techniques. This makes it possible to employ it across varying networks and channels. ACR may be implemented using various other techniques as would be appreciated by a person of ordinary skill in the art.

Existing approaches to inserting supplemental content into a media stream at an appropriate point in time (e.g., right after a cliffhanger scene that has been setup but not resolved yet) are often done manually. But manually inserting the supplemental content into a media stream is often time intensive and error prone. The content source 120's use of ACR to identify scene changes in the media stream solves these technological problems.

The content source 120 may perform ACR on the media stream to identify various types of scene changes. For example, the content source 120 may identify a change of locale, a change of actors, a change of mood, fade to black, fade to white, or other types of scene changes as would be appreciated by a person of ordinary skill in the art.

After performing ACR on the media stream, the content source 120 may identify one or more potential supplemental content spots in the media stream based on the determined scene changes. The one or more potential supplemental content spots may represent possible spots in the media stream for inserting supplemental content. Each potential supplemental content spot may offer higher or lower consumption of the included supplemental content by a user of a media device 106.

The content source 120 may identify potential supplemental content spots in the media stream for each determined scene change. The content source 120 may also identify potential supplemental content spots in the media stream for a subset of the determined scene changes. For example, the content source 120 may identify potential supplemental content spots in the media stream for a subset of the determined scene changes having a particular scene type (e.g., cliffhanger scene changes, change of location scene changes, change of actor scene changes, fade to black, fade to white, etc.).

The content source 120 may also identify potential supplemental content spots in the media stream at random. In other words, content source 120 may identify potential supplemental content spots in the media stream independent of determining any scene changes in the media stream. For example, the content source 120 may randomly select a fixed number of potential supplemental content spots in the media stream.

After identifying potential supplemental content spots in the media stream (whether at random, based on the performance ACR on the media stream, or using another technique as would be appreciated by a person of ordinary skill in the art), the content source 120 may perform a multivariate test involving the potential supplemental content spots and a plurality of media devices 106. Multivariate testing is a technique for testing a hypothesis in which multiple variables are modified. The goal of multivariate testing is often to determine which combination of variations performs the best out of all of the possible combinations. The content source 120 may perform various types of multivariate testing involving the potential supplemental content spots and a plurality of media devices 106 as would be appreciated by a person of ordinary skill in the art. For example, the content source 120 may perform A/B testing involving the potential supplemental content spots and a plurality of media devices 106.

A/B testing is a way to compare two versions of a single variable, typically by testing a subject's response to variant A against variant B, and determining which of the two variants is more effective. For example, a company may perform A/B testing on its website. The company may randomly serve visitors two versions of the website that differ only in the design of a single button element. The company may then measure the relative efficacy of the two designs and adopt the version with higher efficacy.

The content source 120 may perform the multivariate test (e.g., an A/B test) involving the potential supplemental content spots and a plurality of media devices 106. For example, the content source 120 may randomly serve a plurality of media devices 106 two versions of the media stream that differ only in which of two potential supplemental content spots are used to hold test supplemental content. The content source 120 may then measure which of the two potential supplemental content spots had a higher efficacy. For example, the content source 120 may measure which of the two potential supplemental content spots had a higher percentage of users who consumed the entirety of the test supplemental content. In other words, the content source 120 may measure which of the two potential supplemental content spots had a higher percentage of users who watched or listened to the entirety of the test supplemental content.

To ensure accurate measurement of the efficacy of each potential supplemental content spot, the content source 120 may perform the multivariate test (e.g., an A/B test) using the same (or similar) test supplemental content in each potential supplemental content spot. This can ensure that differences in the efficacy of potential supplement content spots is based on differences in their respective locations in the media stream rather than on differences in their respective test supplemental content.

To further ensure accurate measurement of the efficacy of each potential supplemental content spot, the content source 120 may perform the multivariate test (e.g., an A/B test) using a threshold number of media devices 106. The content source 120 may determine a threshold number of media devices 106 that will yield statistically significant results when performing the multivariate test.

The content source 120 may perform the multivariate test (e.g., an A/B test) using a plurality of media devices 106 having a common characteristic. The content source 120 may do this to further ensure accurate measurement of the efficacy of each potential supplemental content spot. The content source 120 may also do this to determine an optimal supplemental content spot to be used for a media device 106 sharing the common characteristic.

The content source 120 may select the plurality of media devices 106 based on the media devices 106 residing in a particular geographic location (e.g., the country of Germany, a particular zip code, etc.) The content source 120 may select the plurality of media devices 106 based on the media devices 106 being active during a particular time of the day (e.g., 7:00 to 10:00 PM). The content source 120 may select the plurality of media devices 106 based on historical behavior of the users of the media devices 106. For example, the content source 120 may select the plurality of media devices 106 based on the users of the media devices 106 historically watching or listening to the end of a program in the media stream a threshold amount of time (e.g., 90% of the time). The content source 120 may also select the plurality of media devices 106 based on the users of the media devices 106 watching or listening through supplemental content a threshold amount of time (e.g., more than 50% of the time). The content source 120 may select the plurality of media devices 106 based on various other characteristics as would be appreciated by a person of ordinary skill in the art.

The content source 120 may measure the efficacies of the potential supplemental content spots by receiving information from the plurality media devices 106 over network 118. For example, the content source 120 may receive an indication from each media device 106 of the plurality media devices 106. The indication may specify whether a user of the respective media device 106 watched or listened through the test supplemental content in the respective potential supplemental content spot.

The content source 120 may determine the optimal supplemental content spot among the plurality of potential supplemental content spots in the media stream based on the measured efficacies of the potential supplemental content spots. For example, the content source 120 may determine that the optimal supplemental content spot is a first potential supplemental content spot because the test supplemental content in the first spot was watched or listened through by users more often than the test supplemental content in other potential supplemental content spots. The content source 120 may further determine that the optimal supplemental content spot is a first potential supplemental content spot because the test supplemental content in the first spot was watched or listened through by users a threshold amount of time more than the test supplemental content in other potential supplemental content spots.

The content source 120 may determine multiple optimal supplemental spots among the potential supplemental content spots in the media stream using multivariate testing. Each optimal supplemental spot may be optimal for a given type of media device 106. The content source 120 may transmit supplemental content using a particular determined optimal supplemental content spot to a media device 106 based on characteristics of the media device 106.

The content source 120 may select a particular one of many determined optimal supplemental content spots for transmission of supplemental content to a media device 106. For example, the content source 120 may select a determined optimal supplemental content spot that generally represents the optimal supplemental content spot for any type of media device 106. In other words, the content source 120 may select a determined optimal supplemental content spot that represents the optimal supplemental content spot independent of any particular characteristics of a media device 106 (e.g., geographic location, time of day it is active, etc.).

The content source 120 may also select a particular determined optimal supplemental content spot for transmission of the supplemental content to a media device 106 based on a particular characteristic of the media device 106. For example, the content source 120 may select an optimal supplemental content spot that is determined optimal for media devices 106 located in a particular location (e.g., the country of Germany, a particular zip code, etc.). The content source 120 may also select an optimal supplemental content spot that is determined optimal for media devices 106 active during a particular time of the day (e.g., 7:00 to 10:00 PM). The content source 120 may also select an optimal supplemental content spot that is determined optimal for media devices 106 having users who historically watch or listen to the end of a program in the media stream a threshold amount of time (e.g., 90% of the time). The content source 120 may also select an optimal supplemental content spot that is determined optimal for media devices 106 having users who watch or listen through supplemental content a threshold amount of time (e.g., more than 50% of the time). The content source 120 may select an optimal supplemental content spot that is determined optimal for media devices 106 based on various other characteristics as would be appreciated by a person of ordinary skill in the art.

Figure 3:
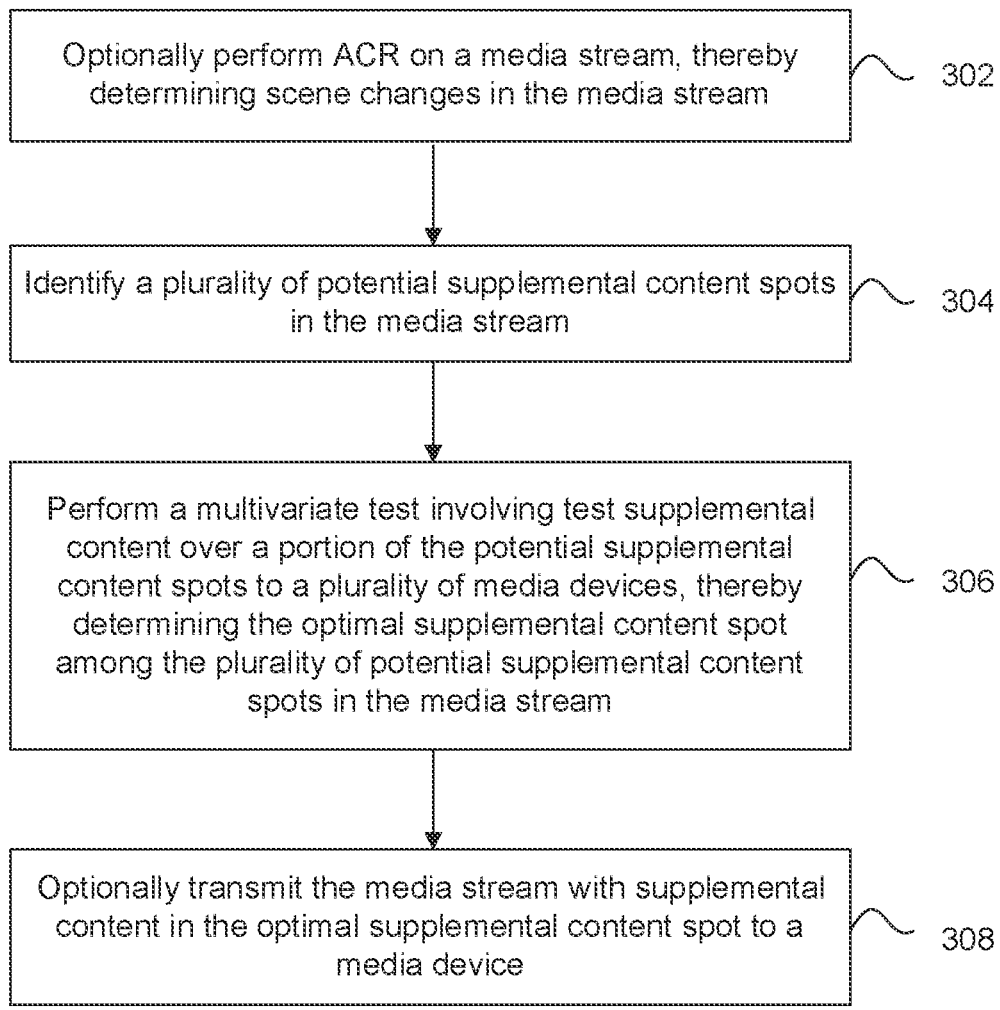
FIG. 3 is a flowchart illustrating a process for automatically determining an optimal spot to insert supplemental content into a media stream, according to some embodiments.

FIG. 3 illustrates a method 300 for automatically determining an optimal spot to insert supplemental content into a media stream to maximize the consumption of the supplemental content by users, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 300 shall be described with reference to FIGS. 1 and 2. However, method 300 is not limited to those examples.

In 302, content source 120 optionally performs ACR on a media stream, thereby determining scene changes in the media stream. The content source 120 may perform ACR on the media stream to identify various types of scene changes. For example, the content source 120 may identify a change of locale, a change of actors, a change of mood, fade to black, fade to white, or other types of scene changes as would be appreciated by a person of ordinary skill in the art.

In 304, content source 120 identifies a plurality of potential supplemental content spots in the media stream. The potential supplemental content spots may represent possible spots in the media stream for inserting supplemental content (e.g., an advertisement, informational message, etc). Each potential supplemental content spot may offer higher or lower consumption of the included supplemental content by a user of a media device 106.

Content source 120 may identify the plurality of potential supplemental content spots in the media stream based on the determined scene changes. Content source 120 may identify potential supplemental content spots in the media stream for a subset of the determined scene changes. For example, the content source 120 may identify potential supplemental content spots in the media stream for a subset of the determined scene changes having a particular scene type (e.g., cliffhanger scene changes, change of location scene changes, change of actor scene changes, fade to black, fade to white, etc.).

Content source 120 may also randomly identify the plurality of potential supplemental content spots in the media stream. For example, the content source 120 may randomly select a fixed number of potential supplemental content spots in the media stream.

In 306, content source 120 performs a multivariate test involving test supplemental content over a portion of the potential supplemental content spots to a plurality of media devices 106, thereby determining the optimal supplemental content spot among the plurality of potential supplemental content spots in the media stream.

Content source 120 may perform the multivariate test using the same (or similar) test supplemental content in each potential supplemental content spot. This can ensure that differences in the efficacy of potential supplement content spots is based on differences in their respective locations in the media stream rather than on differences in their respective test supplemental content.

Content source 120 may perform the multivariate test as an A/B test. For example, content source 120 may measure which of two potential supplemental content spots had a higher efficacy (e.g., a higher percentage of users who consumed the entirety of the test supplemental content).

Content source 120 may select the plurality of media devices 106 for performing the multivariate test based on various characteristics. Content source 120 may select the plurality of media devices 106 for performing the multivariate test based on a geographic region. Content source 120 may also select the plurality of media devices 106 based on a time of day characteristic. Content source 120 may also select the plurality of media devices 106 based on historical playback information.

For example, content source 120 may select the plurality of media devices 106 based on the users of the media devices 106 historically watching or listening to the end of a program in the media stream a threshold amount of time (e.g., 90% of the time). Content source 120 may also select the plurality of media devices 106 based on the users of the media devices 106 watching or listening through supplemental content a threshold amount of time (e.g., more than 50% of the time). Content source 120 may select the plurality of media devices 106 based on various other characteristics as would be appreciated by a person of ordinary skill in the art.

To measure the efficacies of the potential supplemental content spots, content source 120 may determine a portion of the plurality of media devices 106 that outputted an entirety of the test supplemental content. For example, content source 120 may receive an indication from each media device 106 of the plurality media devices 106. The indication may specify whether a user of the respective media device 106 watched or listened through the test supplemental content in the respective potential supplemental content spot.

Content source 120 may determine the optimal supplemental content spot among the plurality of potential supplemental content spots in the media stream based on the measured efficacies of the potential supplemental content spots. For example, content source 120 may determine the optimal supplemental content spot among the plurality of potential supplemental content spots in the media stream based on the determined portion of the plurality of media devices 106 that outputted an entirety of the test supplemental content.

For example, content source 120 may determine that the optimal supplemental content spot is a first potential supplemental content spot because the test supplemental content in the first spot was watched or listened through by users more often than the test supplemental content in other potential supplemental content spots. Content source 120 may further determine that the optimal supplemental content spot is a first potential supplemental content spot because the test supplemental content in the first spot was watched or listened through by users a threshold amount of time more than the test supplemental content in other potential supplemental content spots.

In 308, content source 120 optionally transmits the media stream with supplemental content in the optimal supplemental content spot to a media device 106. Content source 120 may select a particular one of many determined optimal supplemental content spots for transmission of supplemental content to the media device 106. For example, content source 120 may select a determined optimal supplemental content spot that generally represents the optimal supplemental content spot for any type of media device 106.

Content source 120 may also select a particular determined optimal supplemental content spot for transmission of the supplemental content to the media device 106 based on a particular characteristic of the media device 106. For example, content source 120 may select an optimal supplemental content spot that is determined optimal for media devices 106 located in a particular location (e.g., the country of Germany, a particular zip code, etc.). Content source 120 may also select an optimal supplemental content spot that is determined optimal for media devices 106 active during a particular time of the day (e.g., 7:00 to 10:00 PM). Content source 120 may also select an optimal supplemental content spot that is determined optimal for media devices 106 having users who historically watch or listen to the end of a program in the media stream a threshold amount of time (e.g., 90% of the time). Content source 120 may also select an optimal supplemental content spot that is determined optimal for media devices 106 having users who watch or listen through supplemental content a threshold amount of time (e.g., more than 50% of the time). Content source 120 may select an optimal supplemental content spot that is determined optimal for media devices 106 based on various other characteristics as would be appreciated by a person of ordinary skill in the art.

Example Computer System

Figure 4:
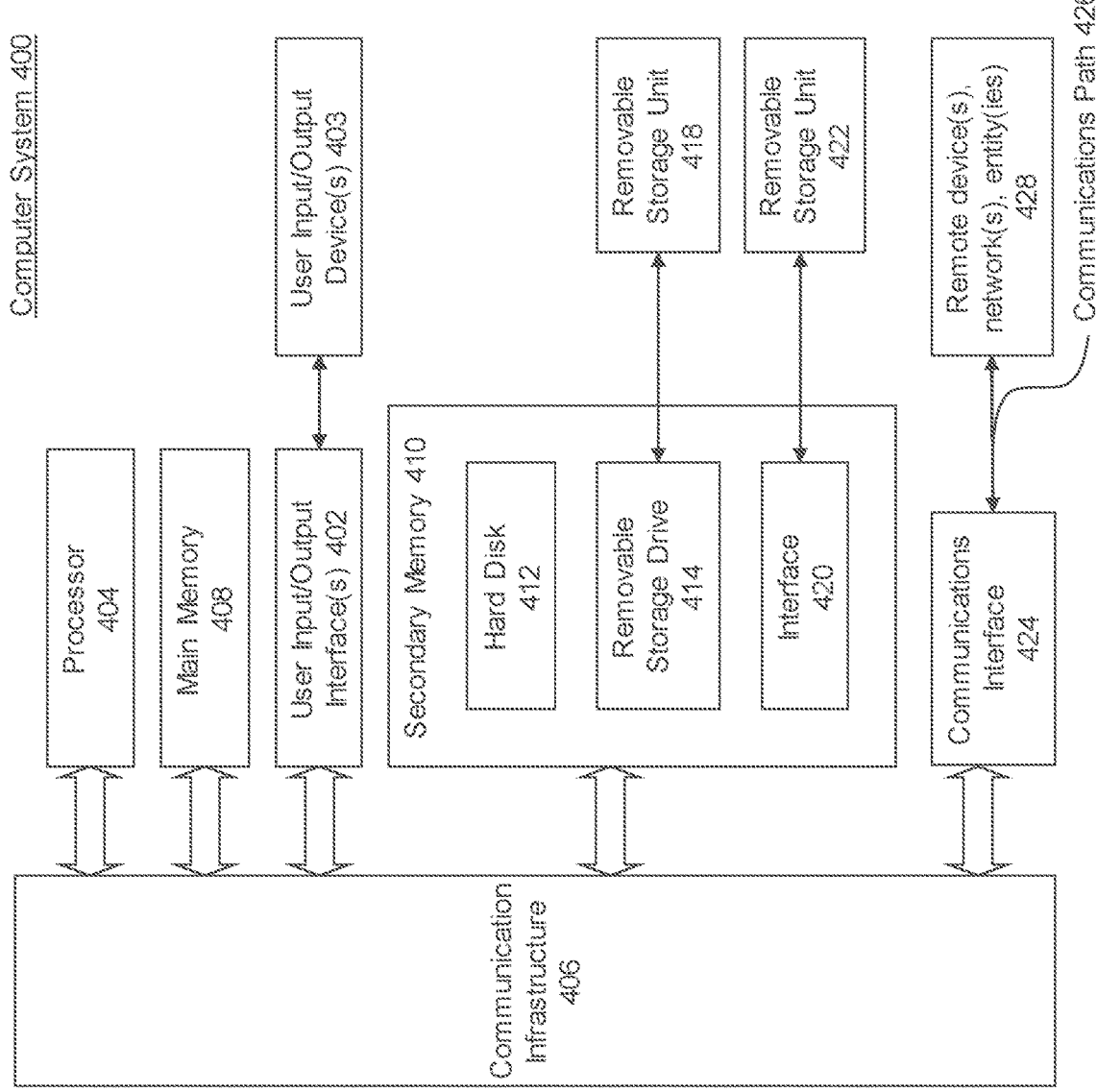
FIG. 4 illustrates an example computer system useful for implementing various embodiments.

Various embodiments may be implemented, for example, using one or more well-known computer systems, such as computer system 400 shown in FIG. 4. For example, the media device 106 may be implemented using combinations or sub-combinations of computer system 400. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/ any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for transmitting supplemental content in an optimal supplemental content spot in a media stream to a media device, comprising:
   identifying a plurality of potential supplemental content spots in the media stream;
   selecting a subset of media devices from a plurality of media devices based on one or more characteristics of the plurality of media devices;
   in response to the selecting, performing a multivariate test involving a test supplemental content item positioned in different ones of the plurality of potential supplemental content spots to the subset of media devices, wherein the performing the multivariate test comprises:
   receiving an indication from each media device of the subset of media devices that specifies whether the media device outputted an entirety of the test supplemental content item positioned in one of the plurality of potential supplemental content spots; and
   determining an optimal supplemental content spot among the plurality of potential supplemental content spots in the media stream based on each indication received from the plurality of media devices; and
   in response to performing the multivariate test, transmitting the media stream with supplemental content in the optimal supplemental content spot to the media device.

2. The computer implemented method of claim 1, wherein the test supplemental content item is an advertisement.

3. The computer implemented method of claim 1, wherein the multivariate test is an A/B test.

4. The computer implemented method of claim 1, wherein the selecting further comprises:
   selecting the subset of media devices based on a geographic region or a time of day characteristic.

5. The computer implemented method of claim 1, wherein the selecting further comprises:
   selecting the subset of media devices based on historical playback information.

6. The computer implemented method of claim 1, wherein the performing the multivariate test further comprises:
   determining a portion of the subset of media devices that outputted an entirety of the test supplemental content item.

7. The computer implemented method of claim 6, wherein the performing the multivariate test further comprises:
   determining the optimal supplemental content spot among the plurality of potential supplemental content spots in the media stream based on the portion of the subset of media devices that outputted the entirety of the test supplemental content item.

8. A system, comprising:
   at least one processor configured to:
   identify a plurality of potential supplemental content spots in a media stream;
   select a subset of media devices from a plurality of media devices based on one or more characteristics of the plurality of media devices;
   in response to the selecting, perform a multivariate test involving a test supplemental content item positioned in different ones of the plurality of potential supplemental content spots to the subset of media devices, wherein to perform the multivariate test the at least one processor is further configured to:
   receive an indication from each media device of the subset of media devices that specifies whether the media device outputted an entirety of the test supplemental content item positioned in one of the plurality of potential supplemental content spots; and
   determine an optimal supplemental content spot among the plurality of potential supplemental content spots in the media stream based on each indication received from the plurality of media devices; and
   in response to performing the multivariate test, transmit the media stream with supplemental content in the optimal supplemental content spot to the media device.

9. The system of claim 8, wherein the test supplemental content item is an advertisement.

10. The system of claim 8, wherein the multivariate test is an A/B test.

11. The system of claim 8, wherein to select the subset of media devices, the at least one processor is further configured to:
    select the subset of media devices based on a geographic region or a time of day characteristic.

12. The system of claim 8, wherein to select the subset of media devices, the at least one processor is further configured to:
    select the subset of media devices based on historical playback information.

13. The system of claim 8, wherein to perform the multivariate test, the at least one processor is further configured to:
    determine a portion of the subset of media devices that outputted an entirety of the test supplemental content item.

14. The system of claim 13, wherein to perform the multivariate test, the at least one processor is further configured to:
    determine the optimal supplemental content spot among the plurality of potential supplemental content spots in the media stream based on the portion of the subset of media devices that outputted the entirety of the test supplemental content item.

15. A non-transitory computer-readable medium having instructions stored thereon that, when executed by at least one computing device, cause the at least one computing device to perform operations comprising:
    identifying a plurality of potential supplemental content spots in a media stream;
    selecting a subset of media devices from a plurality of media devices based on one or more characteristics of the plurality of media devices;
    in response to the selecting, performing a multivariate test involving a test supplemental content item positioned in different ones of the plurality of potential supplemental content spots to the subset of media devices, wherein the performing the multivariate test comprises:
    receiving an indication from each media device of the subset of media devices that specifies whether the media device outputted an entirety of the test supplemental content item positioned in one of the plurality of potential supplemental content spots; and
    determining an optimal supplemental content spot among the plurality of potential supplemental content spots in the media stream based on each indication received from the plurality of media devices; and in response to performing the multivariate test, transmitting the media stream with supplemental content in the optimal supplemental content spot to the media device.

16. The non-transitory computer-readable medium of claim 15, wherein the test supplemental content item is an advertisement.

17. The non-transitory computer-readable medium of claim 15, wherein the selecting further comprises:
selecting the subset of media devices based on a geographic region or a time of day characteristic.

18. The non-transitory computer-readable medium of claim 15, wherein the selecting further comprises:
selecting the subset of media devices based on historical playback information.

19. The non-transitory computer-readable medium of claim 15, wherein the performing the multivariate test further comprises:
determining a portion of the subset of media devices that outputted an entirety of the test supplemental content item.

20. The non-transitory computer-readable medium of claim 19, wherein the performing the multivariate test further comprises:
determining the optimal supplemental content spot among the plurality of potential supplemental content spots in the media stream based on the portion of the subset of media devices that outputted the entirety of the test supplemental content item.

* * * * *

UNITED STATES PATENT AND TRADEMARK OFFICE
CERTIFICATE OF CORRECTION

| | | |
|---|---|---|
| PATENT NO. | : 12,047,617 B2 | Page 1 of 1 |
| APPLICATION NO. | : 18/364881 | |
| DATED | : July 23, 2024 | |
| INVENTOR(S) | : Grover | |

It is certified that error appears in the above-identified patent and that said Letters Patent is hereby corrected as shown below:

In the Claims

In Column 16, Claim 8, Line 1, delete "test" and insert -- test, --, therefor.

Signed and Sealed this
Twenty-third Day of December, 2025

John A. Squires
*Director of the United States Patent and Trademark Office*